Patented Mar. 1, 1949

2,462,855

UNITED STATES PATENT OFFICE 2,462,855

METHOD FOR PREPARING THE 11-AMINO-UNDECYLIC ACID

Michäilas Genas, Paris, France, assignor to Compagnie de produits chimiques et electrometallurgiques Alais Froges et Camargue, Paris, France, a joint-stock corporation of France and Societe des produits chimiques des terres rares, Paris, France, a joint-stock corporation of France No Drawing. Application April 19, 1945, Serial No. 589,281. In France April 21, 1944

8 Claims. (Cl. 260—404)

The present invention relates to the preparation of 11-amino-undecylic acid, the formula of which is $NH_2(CH_2)(CH_2)_9CO_2H$, which is very useful in the preparation of valuable industrial products, particularly synthetic textile materials.

Now, I have found that 11-amino-undecylic acid can be prepared in an industrial way from 11-bromo-undecylic acid. This last mentioned acid is easy to obtain through the action of hydrobromic acid upon 10-11-undecylenic acid in solution in an organic solvent and in the presence of catalysts such as benzoyl peroxide. The fixation of hydrobromic acid in the absence of catalysts leads to the fixation of the halogen on the most substituted carbon, according to the rule set forth by Marcownikoff, that is to say tends to the formation of 10-bromo-undecylic acid, the formula of which is: $CH_3CH_2Br(CH_2)_8CO_2H$. According to Kharasch and his collaborators (Journ. Amer. Chem. Soc., vol. 55, pages 2468, 2521, 2531–133. Vol. 56, page 244, 1934) the tendency in the fixation of hydracids on olefins is reversed when the reaction takes place in the presence of peroxides. In the case of 10-11-undecylenic acid, the fixation of hydrobromic acid, when produced in the presence of peroxides tends to produce chiefly 11-bromo-undecylic acid.

However, a certain proportion of the 10-bromo isomer is produced. The 11-bromo acid can be separated from the 10-bromo acid by crystallization in suitable solvents. But, as will be hereinafter explained, the method according to the present invention makes it possible to start as well from 11-bromo-undecylic acid as from the mixture of the 10 and 11 bromo acids such as results from the reaction of hydrobromic acid on undecylenic acid.

10-11 undecylenic acid is an industrial product obtained by low temperature distillation of castor oil or of methyl or ethyl esters of ricinoleic acid.

It is known that aminoacids can be prepared through the action of ammonia on halogen substituted acids according to the Hoffman method of preparation of amines. In this way, $\alpha$ and $\beta$ aminoacids have been prepared from the corresponding halogen substituted acids, and this with good yields.

But when the halogen is more remote from the carboxyl group, the yield in aminoacid becomes lower, the more so as the amine group is more remote from the carboxyl group.

For instance, Flaschenträger and Halle (Z. Physiol. Ch., vol. 159, page 286, 1926) obtain 10-amino-undecylic acid through the action of an alcoholic solution of ammonia on 10-bromo-undecylic acid with a yield averaging 4 per cent. According to these authors, this low yield is due to the remoteness between the functional groups. According to Lutz (Zentr. Blatt 1910, I, page 907), the main reaction products during the action of ammonia on the halogen substituted $\gamma$, $\delta$, etc., acids are the corresponding oxy-acids.

Now, I have found that, in a wholly unexpected way and contrary to the generally admitted rules, it is possible to prepare 11-amino-undecylic acid through the action of ammonia in aqueous, alcoholic or hydro-alcoholic solution on 11-bromo-undecylic acid, with a yield which may be as high as, and even higher than, 80 per cent of the theoretical yield. The reaction in question can be carried out at relatively low temperatures and under atmospheric pressure or a slightly higher pressure, according to the vapour tension of ammonia.

Under the conditions in which the method according to the present invention is carried out, there is no transformation of 10-bromo-undecylic acid into the corresponding amino acid. This property of said 10-bromo-undecylic acid makes it possible to treat a mixture of 10-bromo and 11-bromo acids, such as results from the action of hydrobromic acid upon 10-11-undecylenic acid in the presence of catalysts such as benzoyl peroxide without obtaining, as reaction product, a mixture of the 10-amino and 11-amino acids the separation of which would be very difficult. As a matter of fact, in the reaction that takes place according to the present invention, the 10-bromo-undecylic acid that is present yields oily products that can easily be separated from 11-amino-undecylic acid, for instance by crystallization of the latter.

The rate at which the reaction takes place depends upon the temperature. At a temperature of 30° C. the reaction, to be complete, must last about 100 hours. At 80° C., it is complete after 5–6 hours. But a rise of the temperature corresponds to a reduction of yield. Thus, the yield, which is about 75 or 80 per cent of the theoretical value at 30° C., drops to 40 per cent when the temperature is raised to 80°. According to the opportunities of manufacture, any suitable temperature can be chosen, preferably within and around these values.

The properties of the new product according to the present invention, to wit 11-amino-undecylic acid, are the following: When crystallized in water, it is in the form of white folia or needles agglomerated into bundles especially if obtained by crystallizing in the cold state from a little concentrated hot solution. Through crystallizing from concentrated solutions, the crystals are very small but very easy to filter. The solubility of the acid according to the invention in boiling water is 6 per cent. Its solubility in cold water is about 0.2 per cent. It is insoluble in alcohol and most of the organic solvents. It is relatively soluble, in the hot state, in acetic acid and phenols. Its melting point is 176° C. The metling point of its paratoluene sulfonamide is 91° C.

I will hereinafter give examples of application of the method according to the present invention. The values given in these examples are in weight:

*Example I*

|  | Parts |
|---|---|
| 11-bromo-undecylic acid | 100 |
| A 25 per cent aqueous solution of ammonia | 300 | are stirred together for two hours at the temperature of the surrounding atmosphere. The rather fluent paste that is formed is maintained at a temperature of 30° C.

The working of the reaction is checked by dosing the ammonium bromide that is formed. The reaction mixture is diluted in 2000 parts of water. It is boiled. The ammonia that is liberated is collected in waetr and the ammoniacal solution is employed for the next operation. During boiling, the solution, which initially was clear, gets cloudy and a small amount of oil separates at the surface thereof. The aqueous layer is decanted and filtered in the hot state. Upon cooling, 11-amino-undecylic acid crystallizes. The crystals are freed from the excess of liquid, washed on a filter with 200 parts of water. In order to obtain a purer product, the acid is again crystallized in 1500 parts of boiling water. After filtering, cooling, removal of the excess of liquid and washing, I obtain 53 parts of 11-amino-undecylic acid. Through concentration of mother liquor, 4 parts of acid are further recovered. The yield thus obtained is 75 per cent of the theoretical yield.

*Example II*

|  | Parts |
|---|---|
| 11-bromo-undecylic acid | 100 |
| A 25 per cent aqueous solution of ammonia | 300 | are heated to a temperature of 60° C. in a closed vessel. A clear solution is obtained. The precipitation of the 11-amino-undecylic acid that is formed begins after about a quarter of an hour.

The reaction is complete after a period of about 10 hours.

Recovery of the desired product can be performed in the manner described in Example I. 40 parts of 11-amino-undecylic acid are obtained. The yield corresponds to about 53 per cent of the theoretical value.

*Example III*

|  | Parts |
|---|---|
| Raw 11-bromo-undecylic acid, that is to say containing 20 per cent of 10-bromo-undecylic acid | 100 |
| A 25 per cent aqueous solution of ammonia | 300 | are treated as described in Example I. Recovery of the desired product is effected in the same manner. 45 parts of 11-amino-undecylic acid are obtained, which corresponds to 74 per cent of the theoretical yield corresponding to the 11-bromo acid that is treated.

*Example IV*

|  | Parts |
|---|---|
| 11-bromo-undecylic acid | 100 |
| Methyl alcohol | 200 |
| A 25 per cent aqueous solution of ammonia | 300 | are left at the temperature of the surrounding atmosphere. After some hours, a precipitate is formed, which is constituted by a mixture of ammonium bromide and 11-amino-undecylic acid. The formation of the theoretical amount of ammonium bromide is complete after about four days. At the end of this period, the excess of alcohol and ammonia is separated by distillation. The mixture is diluted in the hot state, and allowed to crystallize. Then it is freed from the excess of water and washed on a filter with 200 parts of water. The 11-amino-undecylic acid thus obtained is again caused to crystallize in 1000 parts of water. In this way I obtain 46 parts of 11-amino-undecylic acid, the yield corresponding to 61 per cent of the theoretical value.

*Example V*

|  | Parts |
|---|---|
| 11-bromo-undecylic acid | 100 |
| A 25 per cent solution of ammonia in ethyl alcohol | 300 | are kept mixed together for 60 hours at a temperature of 30° C. At the end of this time, the theoretical amount of ammonium bromide is formed.

The excess of alcohol and ammonia is driven off by heating in a water bath. The residue is diluted with 1500 parts of boiling water. Then the method is carried on as in Example IV. In this way I obtain 40 parts of 11-amino-undecylic acid, the yield corresponding to 65 per cent of the theoretical value.

While I have, in the above description, disclosed what I consider to be practical and efficient examples of my invention, it should be well understood that I do not wish to be limited thereto as there might be changes made in these examples without departing from the principle of the present invention as comprehended within the scope of the appended claims.

What I claim is:

1. The method of preparing 11-amino-undecylic acid which comprises the step of subjecting 11-bromo-undecylic acid to the action of a solution of ammonia.

2. The method of preparing 11-amino-undecylic acid which comprises the step of subjecting 11-bromo-undecylic acid to the action of an aqueous solution of ammonia.

3. The method of preparing 11-amino-undecylic acid which comprises subjecting a mixture of 11-bromo-undecylic acid and 10-bromo-undecylic acid to the action of a solution of ammonia, and separating the oily reaction products of the 10-bromo-undecylic acid from the 11-amino-undecylic acid that is obtained.

4. The method of preparing 11-amino-undecylic acid which comprises subjecting a mixture of 11-bromo-undecylic acid and 10-bromo-undecylic acid to the action of an aqueous solution of ammonia and separating the oily reaction products of the 10-bromo-undecylic acid from the 11-amino-undecylic acid that is obtained.

5. The method of preparing 11-amino-undecylic acid which comprises subjecting a mixture of 11-bromo-undecylic acid and 10-bromo-undecylic acid to the action of a solution of ammonia at a temperature ranging from that of the surrounding atmosphere to 80° C. and separating the oily reaction products of the 10-bromo-undecylic acid from the 11-amino-undecylic acid that is obtained.

6. The method of preparing 11-amino-undecylic acid which comprises subjecting a mixture of 11-bromo-undecylic acid and 10-bromo-undecylic acid to the action of an aqueous solution of ammonia at a temperature ranging from that of the surrounding atmosphere to 80° C. and separating the oily reaction products of the 10-bromo-undecylic acid from the 11-amino-undecylic acid that is obtained.

7. The method of preparing 11-amino-undecylic acid which comprises the step of subjecting 11-bromo-undecylic acid to the action of an alcoholic solution of ammonia.

8. The method of preparing 11-amino-undecylic acid which comprises subjecting a mixture of 11-bromo-undecylic acid and 10-bromo-undecylic acid to the action of an alcoholic solution of ammonia and separating the oily reaction products of the 10-bromo-undecylic acid from the 11-amino-undecylic acid that is obtained.

MICHÄILAS GENAS.

REFERENCES CITED

The following references are of record in the file of this patent:

UNITED STATES PATENTS

| Number | Name | Date |
| --- | --- | --- |
| 2,294,442 | Bersworth | Sept. 1, 1942 |
| 2,312,967 | Hanford | Mar. 2, 1943 |

OTHER REFERENCES

Chemical Abstracts, vol. 36, 1942, page 2840.
Chemical Abstracts, vol. 21, 1927, page 258.